(12) United States Patent
Schneider et al.

(10) Patent No.: US 9,805,263 B2
(45) Date of Patent: Oct. 31, 2017

(54) IDENTIFICATION APPARATUS AND IDENTIFICATION METHOD

(71) Applicant: ROBERT BOSCH GMBH, Stuttgart (DE)

(72) Inventors: Klaus Schneider, Ludwigsburg (DE); Mirko Wagner, Goeppingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 20 days.

(21) Appl. No.: 14/899,176

(22) PCT Filed: Apr. 29, 2014

(86) PCT No.: PCT/EP2014/058647
§ 371 (c)(1),
(2) Date: Dec. 17, 2015

(87) PCT Pub. No.: WO2014/202262
PCT Pub. Date: Dec. 24, 2014

(65) Prior Publication Data
US 2016/0140393 A1 May 19, 2016

(30) Foreign Application Priority Data
Jun. 19, 2013 (DE) .................. 10 2013 211 502

(51) Int. Cl.
*G06K 9/00* (2006.01)
*G06K 9/20* (2006.01)
(Continued)

(52) U.S. Cl.
CPC ....... *G06K 9/00671* (2013.01); *G06K 9/2027* (2013.01); *G06K 9/3208* (2013.01);
(Continued)

(58) Field of Classification Search
CPC ............ G06K 9/00671; G06K 9/2027; G06K 9/3208; G06K 9/6202; G06K 2209/19; G07C 2205/02
See application file for complete search history.

(56) References Cited

U.S. PATENT DOCUMENTS

2012/0209470 A1* 8/2012 Gilbert .............. G06F 17/30047
701/31.4
2013/0046592 A1* 2/2013 Ross ................... G06F 3/04815
705/14.4

FOREIGN PATENT DOCUMENTS

DE 10 2010 062283 2/2012
DE 10 2011 076768 12/2012
(Continued)

OTHER PUBLICATIONS

International Search Report for PCT/EP2014/058647, dated Nov. 18, 2014.
(Continued)

*Primary Examiner* — Amara Abdi
(74) *Attorney, Agent, or Firm* — Norton Rose Fulbright US LLP; Gerard Messina

(57) ABSTRACT

An identification apparatus for identifying vehicles and/or vehicle components includes: an image signal receiving unit receiving from an image signal source an image signal containing image data of a vehicle and/or of at least one vehicle component; a memory unit storing data of vehicles and/or at least one vehicle component; a comparison unit comparing the image data received with image data of the data sets stored in the memory unit, and to identify those data sets which contain image data that match the received image data; and an image signal data generating unit which generate output image signal data for at least one output image, the output image signal data containing at least a
(Continued)

portion of the received image data and data from the data sets stored in the memory unit which have been identified by the comparison unit.

9 Claims, 3 Drawing Sheets

(51) Int. Cl.
    *G06K 9/32*       (2006.01)
    *G06K 9/62*       (2006.01)

(52) U.S. Cl.
    CPC ....... *G06K 9/6202* (2013.01); *G06K 2209/19* (2013.01); *G07C 2205/02* (2013.01)

(56) References Cited

FOREIGN PATENT DOCUMENTS

FR         2 951 293      4/2011
WO      WO 00/52541   9/2000

OTHER PUBLICATIONS

Jae Yeol Lee et al.: "Context-aware 3D visualization and collaboration services for ubiquitous cars using augmented reality", The International Journal of advanced Manufacturing Technology, Springer, Berlin, DE, Bd. 37, No. 5-6, Mar. 31, 2007, pp. 431-442.

* cited by examiner

IDENTIFICATION APPARATUS AND IDENTIFICATION METHOD

BACKGROUND OF THE INVENTION

1. Field of the Invention

The present invention relates to an identification apparatus, in particular to an identification apparatus for identifying (motor) vehicles and/or components thereof.

2. Description of the Related Art

In the context of diagnostic work and service work on motor vehicles, situations in which the vehicle being worked on, and/or components of the vehicle, must be identified, for example in order to replace components and make suitable replacement parts available, often occur in the repair shop.

In order to allow the components to be correctly identified in the shop, and so that their installation location in the vehicle can easily be ascertained, the information necessary for this is integrated into diagnostic testers such as those often used in repair shop operations. In order to ascertain the location of a component being sought (e.g. an OBD socket) in the specific vehicle, it is necessary to look into the corresponding diagnostic system or web portal. The images or descriptions contained therein can then be cognitively transferred to the specific vehicle.

This cognitive transfer operation is not trivial especially in complex situations with many components (e.g. in the engine compartment) or with descriptive texts, one reason being that the corresponding information must first be found in the diagnostic system. Because the installation and removal of components is often very time- and labor-intensive, precise and rapid provision of the necessary information that refers to the specific vehicle is desirable.

BRIEF SUMMARY OF THE INVENTION

It is therefore an object of the invention to make available a system that simplifies the identification of vehicles and/or vehicle components in particular in repair shop operation.

An identification apparatus according to the present invention that is provided in particular for identifying vehicles and/or vehicle components has an image signal receiving unit that is embodied to receive an image signal from at least one image signal source, the image signal containing image data of a vehicle and/or of at least one vehicle component; a memory unit in which data sets that contain data referring to at least one vehicle and/or at least one vehicle component, which data can also encompass image data, are stored; and a comparison unit that is embodied to compare the image data received by the image signal receiving unit with image data of the data sets stored in the memory unit, and to identify those data sets which contain image data that match the image data received by the image signal receiving unit; and an image signal data generating unit that is embodied to generate output image signal data for at least one output image, the output image signal data containing at least a portion of the image data received by the image signal receiving unit and data from the data sets stored in the memory unit which have been identified by the comparison unit.

In an embodiment, an image signal output unit, which is embodied to generate at least one image signal from the output image signal data generated by the image signal data generating unit and to output it, is additionally provided.

The image signal data generating unit is preferably embodied so that it inserts data from the identified data sets into the output image, in association with the respective position of a component, when at least one data set that contains image data of the component has been identified by the comparison unit.

Virtual labels, which are based on vehicle data that are stored in the memory unit and which designate the vehicle and/or components of the vehicle, can in particular be overlaid into the output image. The virtual labels can preferably be overlaid into the output image in such a way that on the basis of their position and/or of corresponding markings, which are likewise overlaid into the output image, they are unambiguously associatable with one of the components shown.

Information relating to the vehicle or to its components can in this manner be presented in real time to the user in a live image of the vehicle or of components of the vehicle, so that the user can easily and conveniently identify the vehicle being imaged and/or components of the vehicle.

In an embodiment, the data stored in the memory unit encompass designations and/or installation positions of vehicle components or engine components. The vehicle components or engine components can in this manner be reliably identified and marked in the output image, in order to make it easier for the user to find the vehicle components or engine components in the vehicle.

By comparing image data that are contained in the image signal received from the image signal source with image data stored in the memory unit (which do not obligatorily need be associated with a component), it is possible to determine the current position of the image signal source, and the user can be guided ("navigated") by the system specifically to a predefined destination (e.g. the installation site of a specific vehicle component), whose position is likewise stored in the memory unit, by determining the difference between the current position of the image signal source and the position of the predefined destination and outputting corresponding movement commands ("up," "down," "left," "right," "forward," "back") to the user in order to minimize the difference.

In an embodiment, the image data stored in the memory unit encompass characteristic vehicle features—for example a border around the radiator grill, the shape of the radiator and/or of the rear of the car, the lights, the bumpers, etc.—which are suitable for identification of the vehicle model. The exact model of specific vehicle being imaged can thereby be identified quickly, reliably, and exactly.

For this, the identification apparatus can in particular have a data set combination memory unit in which combinations of data sets are stored, each data set combination being associated in particular with one vehicle model.

The identification apparatus can additionally have an identification unit that is embodied to compare the data sets identified by the comparison unit with data set combinations stored in the data set combination memory unit, and to output those data set combinations in which at least a predefined number of the data sets identified by the comparison unit are contained, so as thereby to identify the vehicle model associated with that data set combination.

Based on the vehicle model thereby identified, the comparison of the image data received by the image signal receiving unit for identification of the components can be limited to a comparison with those data sets which are associated with the vehicle model identified in this manner.

The data sets can also contain specific vehicle information and component information, for example the model name, cubic capacity, and/or configuration of the vehicle, or the names of the components, their manufacturer, and/or the item numbers, so that the vehicle and components installed therein can be unambiguously and reliably identified.

In an embodiment, the comparison unit is additionally embodied to generate information regarding favorable image acquisition positions, image acquisition perspectives, and/or a favorable illumination. In particular, the comparison unit can generate instructions to modify the image acquisition position, image acquisition perspective, and/or illumination if the comparison unit has not identified at least one data set that contains the received image data. Alternatively or additionally, such instructions can also be outputted if multiple data sets have been identified and if the acquired image data therefore cannot be unambiguously associated with one component and/or if one of the data sets contains instructions to modify the image acquisition position, image acquisition perspective, and/or illumination because the image data contained in the data set are ambiguous and therefore cannot be unambiguously associated with one component.

Image acquisition, and vehicle identification or vehicle component identification based on image acquisition, can thus be optimized by acquiring an image that is optimal for the currently desired identification. Identification errors due to an image that is not well suited for the current identification, which for example was acquired from an unfavorable perspective or is poorly illuminated, so that the relevant component is not unambiguously recognizable, can thereby be avoided.

In an embodiment, the identification apparatus encompasses at least one camera that serves as an image source. In this case the identification apparatus can be used without an additional (external) image source.

In an embodiment, the image signal receiving unit is embodied to receive image data wirelessly from an image source. This makes it possible to use a mobile image source and to transfer its data conveniently to the image signal receiving unit. Thanks to wireless data transfer the mobility of the external image source is not impaired, and the user can conveniently acquire pictures of the motor vehicle or of its components from any desired position and perspective.

In an embodiment, the image signal receiving unit is embodied to receive image data of a smartphone, of a tablet PC, and/or of a set of data glasses, which are respectively used as an image source. In this manner, an available smartphone, a tablet PC already present in the shop, and/or a set of data glasses can be used as an economical and/or conveniently usable image source.

In an embodiment, the image signal receiving unit encompasses a transmitting unit that makes it possible to transfer the image signal to a smartphone, to a tablet PC, and/or to a set of data glasses, and to use the smartphone, tablet PC, and/or data glasses as an image output unit in order to display the image generated by the comparison unit. In this manner, a smartphone, a tablet PC, and/or a set of data glasses can be used as an image output unit that is economical (since it is already present in the shop) and/or convenient to operate.

DETAILED DESCRIPTION OF THE INVENTION

Figure 1:
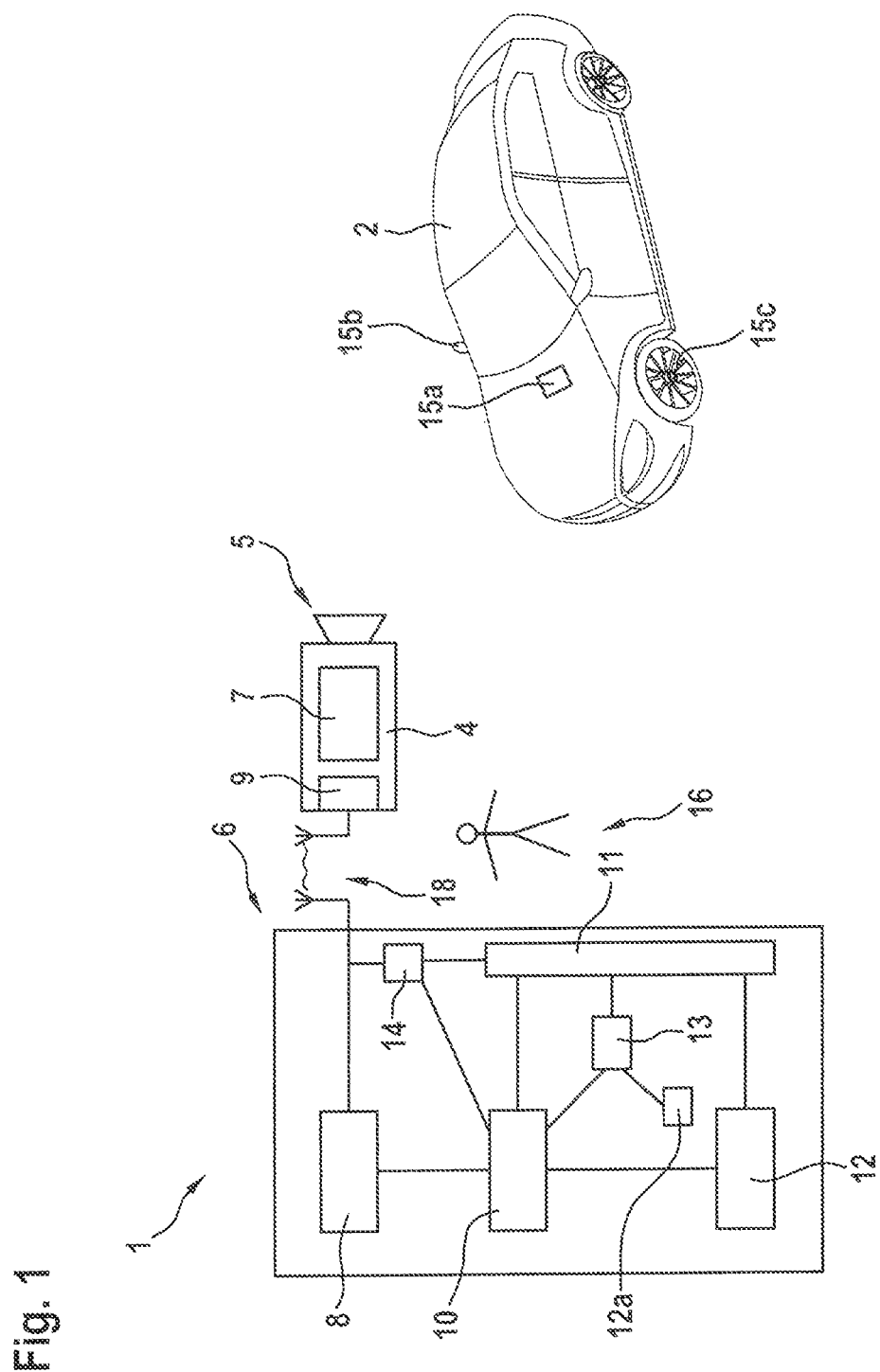
FIG. 1 is a schematic view of an exemplifying embodiment of a motor vehicle diagnostic system having an automatic identification apparatus.

FIG. 1 is a schematic view of an exemplifying embodiment of a motor vehicle diagnostic system having an automatic identification apparatus 1.

A user 16 operates an image acquisition and reproduction unit 4, which can be a commercially usual smartphone, a commercially usual tablet PC, or a set of data glasses, and which is equipped with an image acquisition unit 5, an image reproduction unit 7, and a transmission/reception unit 9.

User 16 holds image acquisition and reproduction unit 4 in such a way that image acquisition unit 5 can acquire at least one image of vehicle 2 and/or images of components 15a, 15b, 15c of vehicle 2 which are relevant for diagnosis, for example engine 15a or parts of the engine, mirror 15b, or wheels 15c.

From transmission and reception unit 9 integrated into image acquisition and reproduction unit 4, the data of the at least one image acquired by image acquisition unit 5 are transferred via a preferably wireless data connection 18, which can be embodied e.g. as a WLAN data connection or Bluetooth® data connection, to an image data receiving unit 8 that is part of a stationary part 6 of identification apparatus 1.

Identification apparatus 1 also has a memory unit 12 in which data sets having vehicle data, in particular image data of vehicles 2 and/or of vehicle components 15a, 15b, 15c, are stored. A comparison unit 10 that is likewise part of identification apparatus 1 compares the image data received by image signal receiving unit 8 with the image data stored in memory unit 12 in order to identify data sets that contain image data that are identical to the image data, acquired by image acquisition unit 5, of vehicle 2 or of components 15a, 15b, 15c thereof.

In order to allow identification of the model of vehicle 2 that has been imaged, identification apparatus 1 also has a data set combination memory unit 12a in which data set combinations are stored, each data set combination in particular being associated with a vehicle model; and a combination identification unit 13 that is embodied to compare the data sets identified by comparison unit 10 with data set combinations stored in data set combination memory unit 12a, and to output those data set combinations in which at least a predefined number of the data sets identified by comparison unit 10 are contained.

Once vehicle 2 being imaged, or its components 15a, 15b, 15c, have been identified, additional information, for example the model of vehicle 2 that has been identified, the model of a component 15a, 15b, 15c that has been identified, and/or its installation location, are taken from memory unit 12.

Identification apparatus 1 also encompasses an image signal generating unit 11 that is embodied to generate an image output signal, the data taken from memory unit 12 in particular also being used to generate the image output signal. The data taken from memory unit 12 are combined with the image data received by image signal receiving unit 8, for example by the fact that the information taken from memory unit 12 is overlaid into the image acquired by image acquisition unit 9, in particular in association with the respective position of an identified component 15a, 15b, 15c. Components 15a, 15b, 15c of vehicle 2 which are visible in the image acquired by image acquisition unit 9 can in this fashion be unambiguously identified and displayed together with the image data acquired by image acquisition unit 9.

The image output data generated by image signal generating unit 11 are transferred by a transmitting unit contained in an image signal output unit 14, via (wireless) data connection 18, to image acquisition and output unit 4 and are displayed there on a display unit 7 embodied there, which can be embodied in particular as a screen or touchscreen.

It is thus easily possible for user 16 to identify vehicle 2, or components 15a, 15b, 15c of said vehicle 2, imaged with image acquisition unit 5 and to obtain additional information regarding vehicle 2 or components 15a, 15b, 15c.

In addition, comparison unit 10 can output instructions to user 16 via screen 7, for example to improve the illumination and/or to modify the position and/or orientation of image acquisition unit 5 in order to improve the quality of the image acquired by image acquisition apparatus 5.

In particular, comparison unit 10 can generate instructions to modify the image acquisition position, image acquisition perspective, and/or illumination if comparison unit 10 has not identified at least one data set that contains the received image data.

Alternatively or additionally, such instructions can also be outputted if comparison unit 10 has identified multiple data sets and the acquired image data therefore cannot be unambiguously associated with one component 15a, 15b, 15c, and/or if one of the identified data sets contains instructions to modify the image acquisition position, image acquisition perspective, and/or illumination because the image data contained in the data set are ambiguous and therefore cannot be unambiguously associated with one component 15a, 15b, 15c.

The division of identification apparatus 1 shown in FIG. 1 into a mobile image acquisition apparatus 5 and a stationary image evaluation apparatus 6 allows image acquisition apparatus 5 to be particularly light and compact. It is also possible, however, to embody image acquisition apparatus 5 and image evaluation apparatus 6 as a common, integrated unit.

In an alternative exemplifying embodiment, it is also possible for only comparison unit 10 and image signal generating unit 11 to be integrated into image acquisition apparatus 5, and for memory unit 12 to be embodied as an external memory that is accessed, for example, via a mobile Internet connection. The external memory can be made available as a virtual Internet memory (e.g. by way of a "cloud" service).

Figure 2:
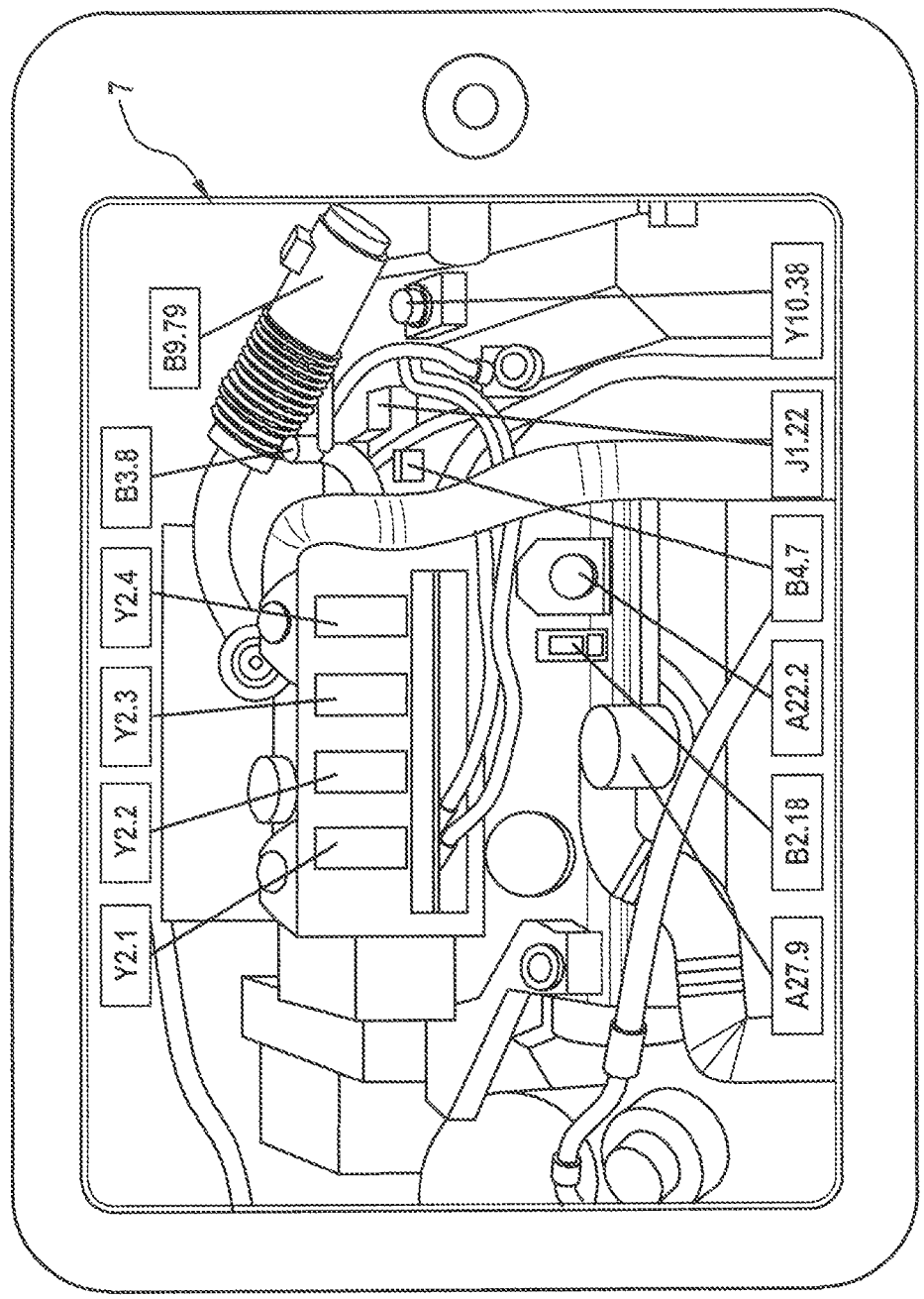
FIG. 2 shows an example of an image acquisition and reproduction unit on whose display unit the image of an engine compartment is displayed.

FIG. 2 shows an exemplifying embodiment of an image acquisition and reproduction unit 4 that is embodied in this instance as a smartphone on whose display unit 7 an image of the interior of an opened engine compartment is displayed. In the displayed image, the individual components 15a, 15b, 15c, which are disposed inside the engine compartment and have been recognized by comparison unit 10, are identified by virtual labels associated with the individual components 15a, 15b, 15c. The virtual labels allow user 16 to easily identify and localize components 15a, 15b, 15c in the engine compartment of motor vehicle 2.

Additionally or on request, a list of components 15a, 15b, 15c identified by comparison unit 10 can be displayed to user 16 on screen 7. An example of an image acquisition and reproduction unit 4 on whose screen 7 a list of this kind is displayed is shown in FIG. 3.

Figure 3:
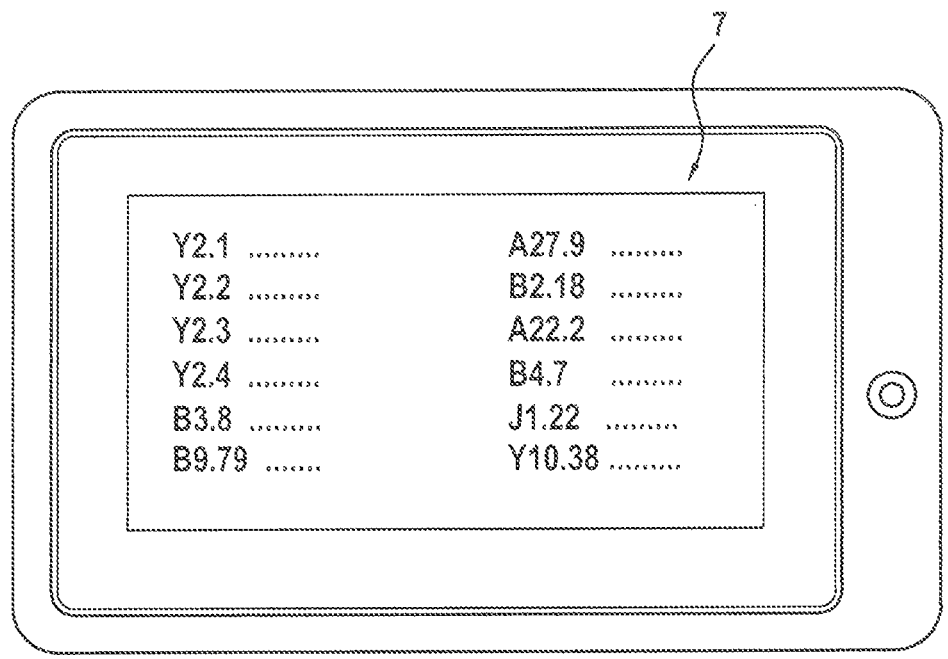
FIG. 3 shows an example of an image acquisition and reproduction unit on whose display unit a component list is displayed.

By selecting ("clicking on") individual components 15a, 15b, 15c, or their labels in the image shown in FIG. 2, or individual entries in the list shown in FIG. 3, additional information regarding the individual components 15a, 15b, 15c, for example their naming code (e.g. Ax.y for control unit), the name of the respective component 15a, 15b, 15c (e.g. "engine controller"), and/or indications as to additional information, for example a functional description or pin allocation, the manufacturer and/or order number of the respective component 15a, 15b, 15c, which is stored in the data set in memory unit 12 associated with the respective component 15a, 15b, 15c, can be displayed.

If identification apparatus 1 is used to detect the specific model of the vehicle, then in addition to the exact designation of the vehicle (model) it is also possible e.g. to display the cubic capacity, the size and number of exhaust pipes, and/or equipment variants such as air conditioning, ABS, etc.

What is claimed is:

1. An apparatus for providing a user-interactive interface display regarding at least one vehicle component of a vehicle, the identification apparatus comprising:

a memory storing a respective data set for each of a plurality of vehicle components and storing a plurality of identifications of respective combinations of multiple ones of the data sets, wherein each of at least a subset of the data sets includes an image of the respective vehicle component with which the data set is associated;

an interface; and processing circuitry;

wherein the processing circuitry is configured to:

receive via the interface image signals obtained from a camera;

begin a comparison of image data of the image signals with images of the data sets stored in the memory;

identify a subset of the data sets that is each determined in the begun comparison to include an image matching at least a portion of the image data of the received image signals;

determine which of the combinations includes at least a predefined threshold number of data sets of the identified subset of data sets;

use the determined combinations to determine information regarding identification of a model of the vehicle;

based on a result of the determination of the information regarding the identification of the model of the vehicle, continue the comparison of the image data of the image signals, limiting the continuation of the comparison to images of fewer of the data sets;

generate, and output to a display via the interface, the user-interactive interface display including an image included in the received image signals with data from the stored data sets that are identified in the continued comparison overlaid on the image, the overlaid data being graphically associated with respective portions of the displayed image identified as corresponding to a respective one of the at least one vehicle component, wherein each of at least one of the associated portions is a selectable region in response to selection of which additional information of the respective data set whose overlaid data is graphically associated with the respective region.

2. The apparatus as recited in claim 1, wherein the processing circuitry is additionally configured to output instructions to modify at least one of a position of the camera, an orientation of the camera, and an illumination, if none of the data sets stored in the memory is identified by the comparison as matching the image data.

3. The apparatus as recited in claim 1, wherein the processing circuitry is additionally configured to output instructions to modify at least one of a position of the camera, an orientation of the camera, and an illumination, if at least two of the data sets stored in the memory are identified based on the comparison as matching the image data and are of at least two different vehicle components such that the image data are not unambiguously associable with only one vehicle component.

4. The apparatus as recited in claim 1, wherein the receipt of the image signals is via a wireless connection.

5. The apparatus as recited in claim 4, wherein the camera is part of at least one of a smartphone, a computer, and a set of data glasses.

6. The apparatus as recited in claim 4, wherein the display to which the output is provided is a component of at least one of a smartphone, a computer, and a set of data glasses.

7. A method for providing a user-interactive interface display regarding at least one vehicle component of a vehicle, wherein a memory stores a respective data set for each of a plurality of vehicle components and storing a plurality of identifications of respective combinations of multiple ones of the data sets, wherein each of at least a subset of the data sets includes an image of the respective vehicle component with which the data set is associated, the method comprising:

acquiring, by processing circuitry, image signals obtained from a camera;

beginning, by the processing circuitry, a comparison, by the processing circuitry, of image data of the image signals with images of data sets stored in a memory that stores a respective data set for each of a plurality of vehicle components and stores a plurality of identifications of respective combinations of multiple ones of the data sets, wherein each of at least a subset of the data sets includes an image of the respective vehicle component with which the data set is associated identifying, by the processing circuitry, a subset of the data sets stored in the memory that is each determined in the begun comparison to include an image of the received image signals;

determining, by the processing circuitry, which of the combinations includes at least a predefined threshold number of data sets of the identified subset of data sets;

using, by the processing circuitry, the determined combinations to determine information regarding identification of a model of the vehicle;

based on a result of the determination of the information regarding the identification of the model of the vehicle, continuing, by the processing circuitry, the comparison of the image data of the image signals, limiting the continuation of the comparison to images of fewer of the data sets;

the processing circuitry generating and outputting the user-interactive interface display including an image included in the received image signals with data from the stored data sets that are identified in the continued comparison overlaid on the image, the overlaid data being graphically associated with respective portions of the displayed image identified as corresponding to a respective one of the at least one vehicle component, wherein each of at least one of the associated portions is a selectable region in response to selection of which additional information of the respective data set whose overlaid data is graphically associated with the respective region.

8. The apparatus as recited in claim 1, further comprising the display to which the user-interactive interface display is output.

9. The apparatus as recited in claim 1, wherein the processing circuitry is configured to respond to the comparison identifying a particular one of data sets as matching by outputting an instruction to adjust a condition of the camera to obtain new image data on the basis of which to re-perform the comparison of the same vehicle components imaged in the image data that has been matched to the particular data set.

* * * * *